United States Patent
Morreale

[11] 3,790,831
[45] Feb. 5, 1974

[54] APPARATUS FOR DAMPING OSCILLATIONS IN A STEPPING MOTOR

[75] Inventor: Anthony P. Morreale, Whittier, Calif.

[73] Assignee: Computer Devices Corporation, Sante Fe Springs, Calif.

[22] Filed: June 9, 1972

[21] Appl. No.: 261,501

[52] U.S. Cl. .................... 310/74, 310/49, 310/153
[51] Int. Cl. ............................................. H02k 7/02
[58] Field of Search ....... 310/49, 74, 153, 152, 154, 310/51; 74/573

[56] References Cited
UNITED STATES PATENTS

| | | | |
|---|---|---|---|
| 653,424 | 7/1900 | Lunt | 310/74 |
| 2,801,352 | 7/1957 | Lipfert | 310/49 |
| 2,963,599 | 12/1960 | Gayler | 310/153 |
| 2,446,290 | 8/1948 | Lovegrove | 310/49 |
| 3,545,301 | 12/1970 | Richter | 310/74 |
| 3,519,859 | 7/1970 | Morreale | 310/49 |
| 3,660,703 | 5/1972 | Evans | 310/74 |

*Primary Examiner*—R. Skudy
*Attorney, Agent, or Firm*—Christie, Parker & Hale

[57] ABSTRACT

A stepping motor damping unit in which the freely rotating flywheel is journaled on the shaft of a stepping motor. The flywheel is provided with a permanent magnet. A plate of magnetic material is secured to the shaft of the motor and the magnet of the flywheel attracts it to the plate. A disk of friction material is positioned between adjacent parallel surfaces of the flywheel and the plate to provide a non-magnetic gap and at the same time provide wear-resistant low friction surfaces allowing for relative rotation between the plate and the flywheel.

2 Claims, 2 Drawing Figures

APPARATUS FOR DAMPING OSCILLATIONS IN A STEPPING MOTOR

FIELD OF THE INVENTION

This invention relates to stepping motors, and more particularly, is concerned with a magnetic damping unit for damping oscillations inherent in the operation of a stepping motor.

BACKGROUND OF THE INVENTION

Digital stepping motors are well known in which the motor shaft can be electrically stepped through incremental angular positions. The rotor of the motor is rotated by electrically pulsing the motor, each pulse or pattern of pulses advancing the rotor in discreet steps in either direction. This stepping of the rotor results in rapid acceleration and deceleration as the rotor is stepped from position to position. Thus in stepping or indexing from position to position, the rotor vibrates in coming to rest at each discreet angular position of the stepping motor. To minimize such vibration, damping of the stepping motor may be required so as to reduce any such oscillation about each discreet angular position as the rotor comes to a stop.

Various types of mechanical and fluid type dampers have heretofore been proposed, such as the one described, for example, in U.S. Pat. No. 3,286,109. Such known damping systems are subject to one or more of the following disadvantages. Mechanical dampers are subject to rapid wear and changes in the characteristics of the damping unit throughout the life of the unit. Furthermore they are not easily adjusted to provide the correct damping for any given size of motor or load. Fluid-type dampers, while providing longer life, are not readily adjustable for varying conditions and are more susceptible to changes in ambient operating conditions. Moreover, fluid dampers particularly provide a damping force which is proportional to angular velocity, which presents a problem under conditions in which the stepping motor is rotated continuously, referred to as "slewing".

SUMMARY OF THE INVENTION

The present invention provides a damper which avoids and overcomes the above problems encountered with known prior arrangements for damping stepping motors in that it is subject to substantially no mechanical wear problems. The damping force remains constant throughout the life of the damping unit. The damping unit is easily adjusted to provide varying degrees of damping so as to be compatible with varying loads, it does not interfere with slewing operation of the motor, and it substantially reduces or eliminates mechanical vibrations and noise through the operating range of the motor.

This is accomplished in brief by providing the stepping motor with a flywheel which is journaled to rotate freely on the shaft of the stepping motor. The flywheel is provided with a permanent magnet which attracts the flywheel in an axial direction toward a plate secured to and rotated with the shaft of the stepping motor. A friction disk of non-magnetic material maintains a predetermined space between the adjacent surfaces of the plate and the flywheel.

BRIEF DESCRIPTION OF THE DRAWINGS

For a more complete understanding of the invention reference should be made to the accompanying drawing wherein.

DETAILED DESCRIPTION

Figure 2:
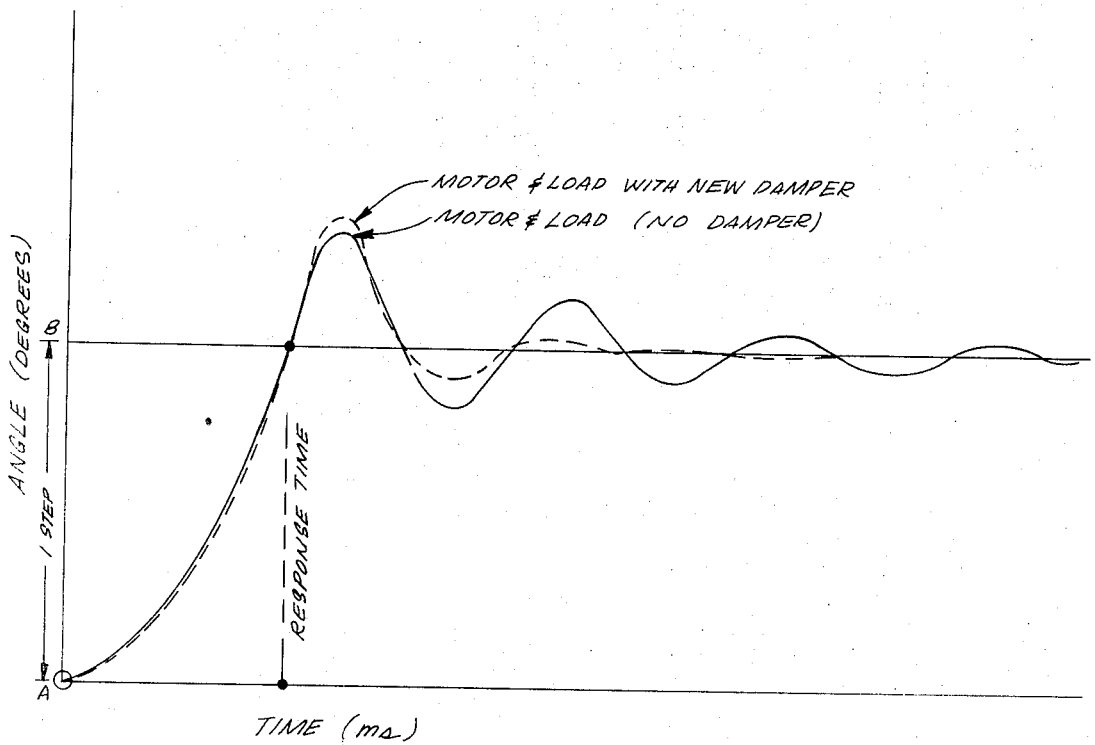
FIG. 2 shows a response curve showing the characteristics of the motor with and without the damper.

Referring to the drawings in detail, the number 10 indicates generally a stepper motor which preferably is the type described in U.S. Pat. No. 3,519,859. The stepper motor is arranged to step an output shaft 12 through incremental angular steps of a few degrees at a time, or may rotate the shaft continuously or through a large angle, referred to as slewing. The stepping motor, while providing very accurate angular indexing, is limited in the speed at which it can step from one angular position to the next by the time it takes to accelerate and decelerate the rotating mass of the motor. Various attempts have been made to reduce the inertia by reducing the mass of the rotor, such as described in the above patent. However, the torque available to decelerate the rotor when locking into a step position is derived from a permanent magnet. Thus even though attempts are made to reduce the mass, the deceleration torque is not sufficient to prevent substantial overshoot of the step position of the rotor before it comes to rest. As a result, oscillations or vibrations are set up in the rotor as it comes to rest at its new step position. These oscillations are shown graphically in FIG. 2 by the solid line, which is a plot of the angle of the rotor as a function of time. At time 0, the acceleration torque is applied to the rotor which changes its angle to the next step position, as the rotor advances a single step from angular position A to angular position B. The rotor overshoots angular position B and eventually settles down after a series of oscillations about the angular position B, as shown in FIG. 2. By introducing increased damping, the number and amplitude of oscillations required for the rotor to settle down to the new angular position can be minimized, as indicated by the dotted line of FIG. 2.

Figure 1:
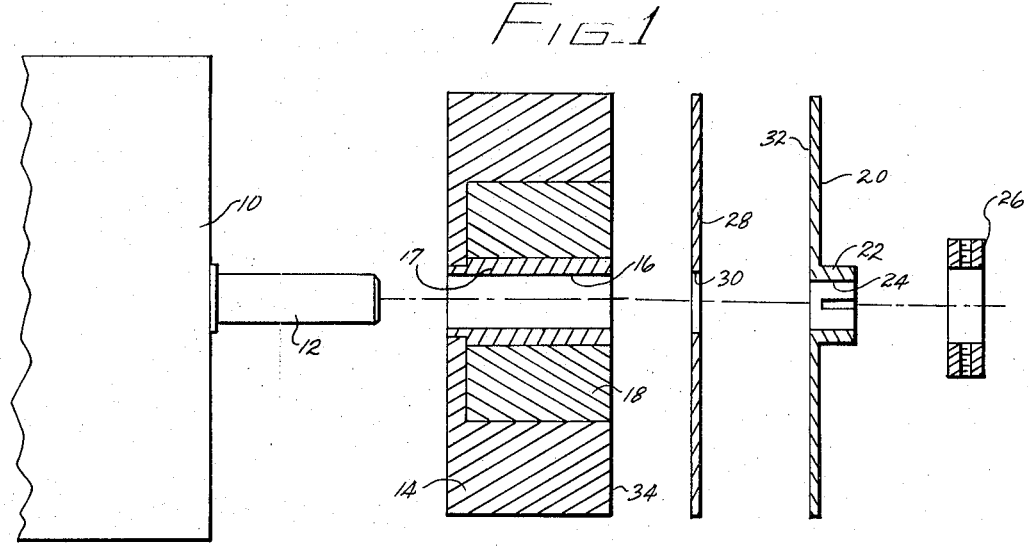
FIG. 1 is an exploded assembly, partially in section, of the preferred embodiment of the present invention.

The damping arrangement as shown by FIG. 1, according to the present invention, comprises a flywheel 14 having a bore 16 by which the flywheel is journaled on the shaft 12 of the stepping motor 10. The bore preferably is provided by a separate bushing 17. Embedded in the flywheel 14 is an annular shaped permanent magnet 18 which is polarized in a direction parallel to the axis of rotation. The flywheel is made of a material of high magnetic permeability such as mild steel to provide a low reluctance magnetic path for the flux produced by the magnet.

In addition, the damping assembly includes a plate 20 having a hub 22 through which extends an opening 24 that receives the shaft 12 of the stepping motor 10. Slipping over the hub 22 is a clamping collar 26 which clamps the hub 22 securely in position on the shaft 12. Positioned between the plate 20 and the flywheel 14 is a friction disk 28, which may be made from Teflon, for example. The disk 28 is provided with an opening 30, permitting it to be slipped over the shaft 12 when in assembled position. The plate 20 is provided with a flat surface 32 which engages one side of the disk 28 while the flywheel 14 is provided with a parallel flat surface 34 which engages the other side of the disk 28.

The plate 20 is also made of a high magnetic permeability material such as steel so that the plate and flywheel combine to form a low-reluctance flux path for the flux formed by the magnet 18. The flywheel 14, which is freely rotatable on the shaft 12 both angularly and axially, is drawn toward the plate 20 with considerable force by the strength of the magnet 18, thereby squeezing the disk 28 between the parallel surfaces 32 and 34.

In operation, when the stepping motor is energized to step the shaft one step from angular position A to angular position B, for example, the relatively high inertia of the flywheel causes it to remain substantially at rest while the plate 20 rotates with the stepping motor. Because of the normal force produced by the magnet 18, a frictional force between the disk 28 and the surfaces 32 and 34 causes a torque to be applied to the flywheel from rotation of the plate 20. Because of the relatively large inertia of the flywheel, it tends to remain at rest and the torque applied to it is so low that it barely begins to rotate by the time the place 20 has stepped to the new angular position. This rotation of the mass of the flywheel, while tending to increase slightly the initial overshoot, results in a counter-torque being applied to the plate 20 when the plate 20 reverses its direction on the first oscillation. Thus the flywheel through the disk substantially reduces the tendency of the plate 20 and rotor of the stepping motor 10 to oscillate back and forth about the equilibrium position, thus providing damping as shown by the dotted line of FIG. 2. Moreover, when the stepping motor is rotated through larger angles in a slewing operation, the flywheel does not add any continuous drag on the motor, since the flywheel is brought up to the same angular speed as the plate 20, at which point no further friction drag occurs during the rotation of the motor.

The degree of drag can be readily controlled in the damping assembly as shown simply by replacing the disk 28 with disks of different thicknesses, since the normal force exerted by the permanent magnet 18 in squeezing the disk between the surfaces 32 and 34 is dependent on the size of the non-magnetic gap between these two surfaces. Thus the thinner the disk, the greater the normal force. The wear characteristics of the disk 28 are such that the normal force produced by the magnet is substantially constant over the life of the unit. Of course the normal force can also be controlled by varying the degree to which the magnet 18 is magnetized, thus providing a wide range of damping for operation with different size stepping motors and different size loads.

What is claimed is:

1. Apparatus for damping oscillations in the output shaft of a stepping motor, comprising:
    a first member journaled on the shaft of the stepping motor, the first member being freely movable relative to the shaft both angularly and axially;
    a second member secured to the shaft and rotatable therewith, the first and second members having opposing parallel surfaces and being made of magnetic material;
    a disk of wear resistant non-magnetic non-conductive material positioned between said surfaces for maintaining a high reluctance gap between the opposing surfaces of said members, the wear resistant material being in frictional contact with the two opposing surfaces;
    permanent magnet means mounted in said first member and producing flux across the gap between said opposing surfaces for urging the first member toward the second member, the wear resistance material being continuously squeezed between the opposing surfaces by the magnetic attraction between the two members.

2. Apparatus of claim 1 wherein the permanent magnet is annular in shape and is polarized in a direction parallel to its axis of revolution, the permanent magnet being positioned with its axis of revolution coaxial with the shaft of the motor.

* * * * *